United States Patent [19]
Dijkstra et al.

[11] Patent Number: 4,619,119
[45] Date of Patent: Oct. 28, 1986

[54] HEAT PUMP COMPRISING A THERMALLY DRIVEN LIQUID PUMP AND LIQUID PUMP FOR USE IN A HEAT PUMP

[75] Inventors: Kees Dijkstra; Jan Huizinga, both of Eindhoven, Netherlands

[73] Assignee: U.S. Philips Corporation, New York, N.Y.

[21] Appl. No.: 695,987

[22] Filed: Jan. 29, 1985

Related U.S. Application Data

[63] Continuation of Ser. No. 585,954, Mar. 5, 1984, abandoned.

[30] Foreign Application Priority Data

Mar. 5, 1984 [NL] Netherlands ............ 8304359

[51] Int. Cl.$^4$ ............................................. F25B 13/00
[52] U.S. Cl. ......................... 62/324.2; 62/238.3; 62/476
[58] Field of Search ............ 62/101, 476, 324.2, 62/238.3

[56] References Cited
U.S. PATENT DOCUMENTS

3,046,756  7/1962  Whitlow et al. .............. 62/476 X
3,293,881  12/1966  Walker ........................... 62/476

Primary Examiner—Lloyd L. King
Attorney, Agent, or Firm—Rolf E. Schneider

[57] ABSTRACT

A heat pump, in which there is arranged in a circuit between an absorber (7) and a generator (1) a liquid pump (9) comprising a piston (35) which is displaceable in a cylinder (33) and forms the separation between a gas chamber (37) and a liquid chamber (39) in which simultaneously prevails a pressure of comparatively low level during the suction stroke and a pressure of comparatively high level during the delivery stroke. A guide member (47) secured to the cylinder (33) encloses with the piston (35) an auxiliary chamber (51) of variable volume in which liquid of comparatively low pressure at least during the delivery stroke is constantly present. The gas chamber (37) is connected to alternately a lead of low and high gas pressure (69 and 71, respectively) in the heat pump, while the liquid chamber (39) is connected synchronously therewith alternately to a lead of low and high pressure (11a and 11b, respectively) in the heat pump. The heat pump provides an attractive solution especially for domestic heating for pumping liquid solution between the generator and the absorber because of the low-noise and low-energy liquid pump driven by means of pressure differences in the heat pump itself.

8 Claims, 10 Drawing Figures

HEAT PUMP COMPRISING A THERMALLY DRIVEN LIQUID PUMP AND LIQUID PUMP FOR USE IN A HEAT PUMP

This is a continuation, of application Ser. No. 585,954, filed Mar. 5, 1984, now abandoned.

The invention relates to a heat pump comprising a first circuit in which a working medium is passed from a generator successively to a condenser, an evaporator and an absorber and a second circuit in which a solution of the working medium and a solvent which is comparatively poor in working medium content is passed from the generator to the absorber and a solution of the working medium and a solvent which is comparatively rich in working medium content is passed from the absorber to the generator, the transport of the rich solution from the absorber to the generator taking place by means of a liquid pump which is arranged in a connection between the absorber and the generator and having a liquid piston displaceable in a cylinder in a reciprocatory manner and whose movement is reversible by means of a gas switch which alternately connects a working surface of the liquid piston to gaseous working medium in the heat pump at a comparatively low and high pressure level.

The invention further relates to a liquid pump for use in a heat pump of the kind described above.

In a known heat pump (see "Handbuch der Kältetechnik" by R. Plank, Volume VII, 1959, p. 415–416) of the kind mentioned in the opening paragraph, the rich solution is pumped from the absorber to the generator by a liquid pump which is driven by utilizing pressure differences in the working medium of the heat pump obtained by heating. Consequently, in fact the drive is thermal because an external mechanical source of force for displacing the liquid piston is not necessary at all. The liquid piston has secured to it a driving rod which is coupled to a gas piston. The movement is obtained in that with a substantially equal pressure difference across both pistons the liquid piston is given a smaller working surface than the gas piston. By means of a gas switch switchable by the driving rod, the direction of movement of the gas piston is reversed. Each of the pistons is situated in a separate cylinder which has a passage for the driving rod.

A disadvantage of the known heat pump and liquid pump, respectively, is that both pistons have to be provided with seals along a circumference of comparatively great length because of the considerable pressure difference across the pistons. Further, two passages for the driving rod are required, which moreover have to be sealed because a comparatively large pressure difference exists across these passages. Due to the construction with two pistons, the known heat pump and liquid pump, respectively, is comparatively voluminous and rather complicated.

The invention has for its object to provide a heat pump in which the aforementioned disadvantages are avoided.

For this purpose, the invention is characterized in that the said working surface constitutes a first working surface of the liquid piston facing a gas chamber located in the cylinder, which piston further has a second working surface which faces a liquid chamber located in the cylinder and which is smaller than the first working surface and is separated therefrom by the liquid piston, the gas chamber being connected to the gaseous medium in the heat pump alternately at a comparatively low and high pressure level, whilst synchronously therewith the liquid chamber is connected to the liquid solution in the heat pump alternately at a comparatively low and a comparatively high pressure level, which cylinder is provided with a guide for the piston arranged in the liquid chamber and passed into a recess in the piston, whilst an end face of the guide member constitutes with the recess an auxiliary chamber having a variable volume of liquid solution, whose pressure level at least during the delivery stroke of the liquid piston is substantially equal to the low pressure level of the liquid solution in the heat pump.

The invention further has for its object to provide a liquid pump for use in a heat pump in which the said disadvantages are avoided.

For this purpose, the invention is further characterized in that the said working surface constitutes a first working surface of the liquid piston facing a gas chamber located in the cylinder, which piston further has a second working surface which faces a liquid chamber located in the cylinder and which is smaller than the first working surface and is separated therefrom by the liquid piston, the gas chamber being connected to the gaseous working medium in the heat pump alternately at a comparatively low and high pressure level, whilst synchronously therewith the liquid chamber is connected to the liquid solution in the heat pump alternatively at a comparatively low and a high pressure level, which cylinder is provided with a guide member for the piston arranged in the liquid chamber and passed into a recess of the piston, whilst an end face of the guide member constitutes with the recess an auxiliary chamber having a variable volume of liquid solution, whose pressure level at least during the delivery stroke of the liquid piston is substantially equal to the low pressure level of the liquid solution in the heat pump.

Since the comparatively low pressure level and the comparatively high pressure level invariably prevail during the suction stroke and the delivery stroke, respectively, both on the liquid side and on the gas side of the piston, the pressure difference across the piston is theoretically equal to zero. Due to low flow losses in the so-called thermal pump part of the heat pump, in practice only negligible pressure differences occur across the piston, which do not give rise to any sealing problem along the comparatively large circumference of the piston. The pressure difference between the liquid chamber and the auxiliary chamber does not give rise to problems either because the circumference of the auxiliary chamber is comparatively small.

A particular embodiment of a heat pump comprising a liquid pump of very compact construction is characterized in that the piston is provided with a gas duct which after rotation of the piston in a first direction of rotation during the suction stroke forms a connection between the gas chamber and a low-pressure gas port in the cylinder and with a liquid duct which after rotation of the piston in the first direction of rotation during the suction stroke forms a connection between the liquid chamber and a low-pressure liquid port in the cylinder, whilst after rotation of the piston in a second direction of rotation opposite to the first direction of rotation the gas duct in the piston forms a connection between the gas chamber and a high-pressure gas port in the cylinder and the liquid duct in the piston forms a connection between the liquid chamber and a high-pressure liquid port in the cylinder.

A further embodiment of the heat pump in which the reversal of the movement of the liquid piston is obtained in a simple manner, is characterized in that the cylinder is provided with a fixedly arranged pin which constitutes a guide for a slot in the piston which has the form of a continuous curve having two tracks which are parallel to the central axis of the piston and are interconnected by tracks extending at an angle to the central axis.

A still further embodiment of a heat pump in which leakage from high pressure to low pressure is limited to a minimum, is characterized in that the cylinder is provided with two sealing edges of the high-pressure gas port and the low-pressure gas port, respectively, engaging the piston with resilient force of an elastic bellow, and with two sealing edges of the high-pressure liquid port and the low-pressure liquid port, respectively, engaging the piston with resilient force of an elastic bellow, whereby the bellows corresponding to the gas ports form a connection of the relevant gas port to the gas duct in the piston, while the bellows corresponding to the liquid ports form a connection from the relevant liquid port to the liquid duct in the piston.

Another embodiment of the heat pump with a reversal of the movement of the liquid piston obtained by a liquid switch and a gas switch is characterized in that the gas chamber is connected by means of the gas switch to gaseous working medium in the heat pump alternately at a comparatively low and a comparatively high pressure, whilst synchronously therewith the liquid chamber is connected by means of a liquid switch to liquid solution in the heat pump alternately at a comparatively low and a comparatively high pressure.

A preferred embodiment of the heat pump having a liquid switch and a gas switch integrated to a compact switching unit is characterized in that an integrated unit of a liquid switch and a gas switch comprises a common switching slide displaceable in a housing in a reciprocatory manner and having two switching positions, whereby in a first switching position corresponding to the beginning of the suction stroke a connection is formed by means of a first recess in the switching slide between a first gas port in the housing at a comparatively low pressure level and a first working surface of the switching slide and a connection is formed by means of a second recess in the switching slide between a first liquid port in the housing at a comparatively high pressure level and a second working surface of the the switching slide located opposite the first working surface and to the said auxiliary chamber, whilst in a second switching position corresponding to the beginning of the delivery stroke a connection is formed by means of the first recess between a second gas port in the housing at a comparatively high pressure level and the first working surface and a connection is formed by means of the second recess between a second liquid port in the housing at a comparatively low pressure level and the second working surface, and to the said auxiliary chamber.

A further embodiment of the heat pump in which dead centres during the reversal of the direction of movement of the liquid piston are avoided in a simple manner, is characterized in that a switching slide of the liquid switch or of integrated unit of liquid switch and gas switch is mechanically coupled during a part of the suction stroke and the delivery stroke by means of a first spring and a second spring, respectively, to the movement of a follower rod which is secured to the piston and is arranged coaxially with respect to the switching slide and the central axis of the piston and is freely displaceable with respect to the follower rod during another part of the suction stroke and the delivery stroke.

A still further embodiment of the heat pump in which leakage between gas and liquid ports of different pressures is avoided in a simple manner, is characterized in that in the gas switch or in the integrated unit of liquid switch and gas switch, respectively, ports and spaces at comparatively high and comparatively low gas pressure are separated from each other by a sealing liquid of comparatively high pressure which is supplied through a duct system in the housing and the switching slide.

An embodiment of a liquid pump for use in a heat pump in which the use of seals is avoided as far as possible, is characterized in that the said working surface constitutes a first working surface of the liquid piston facing a gas chamber located in the cylinder, which piston further has a second working surface which faces a liquid chamber located in the cylinder and which is smaller than the first working surface and is separated therefrom by the liquid piston, the gas chamber being connected to the gaseous working medium in the heat pump alternately at a comparatively low and a comparatively high pressure level, whilst synchronously therewith the liquid chamber is connected to the liquid solution in the heat pump alternately at a comparatively low and a comparatively high pressure level, which cylinder is provided with a guide member for the piston arranged in the liquid chamber and passed into a recess in the piston, whilst an end face of the guide member constitutes with the recess an auxiliary chamber having a variable volume of liquid solution, whose pressure level at least during the delivery stroke of the liquid piston is substantially equal to the low pressure level of the liquid solution in the heat pump.

The invention will be described more fully with reference to the drawing, in which.

Figure 1:
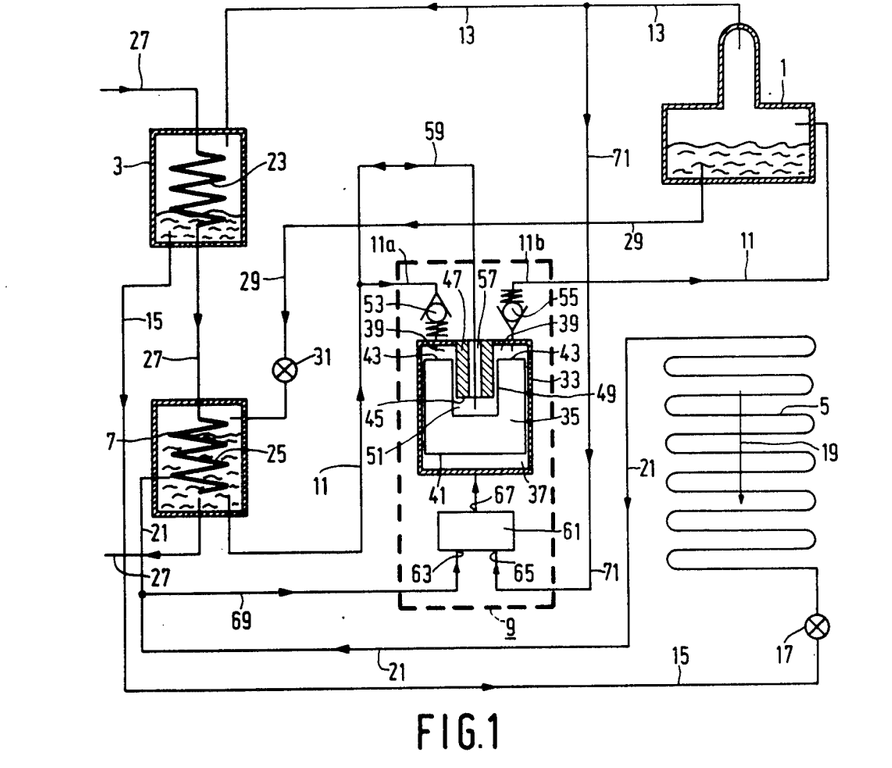
FIG. 1 shows diagrammatically an absorption heat pump.

The heat pump shown in FIG. 1 belongs to the category of the absorption heat pumps comprising a first circuit in which a working medium, such as, for example, ammonia (NH3), is passed from a generator 1 successively to a condenser 3, an evaporator 5 and an absorber 7 and a second circuit in which an ammonia-depleted solution of ammonia in water is passed from the generator 1 to the absorber 7 and an ammonia-enriched solution of ammonia in water is passed from the absorber 7 to the generator 1. The transport of the rich solution from the absorber 7 to the generator 1 takes place by means of a liquid pump 9 which is arranged in a lead 11 between the absorber 7 and the generator 1. The liquid pump 9 is indicated diagrammatically in FIG. 1 by a dotted line. From the generator 1 gaseous ammonia is passed through a lead 13 to the condenser 3, in which it is condensed, after which it is passed through a lead 15 via a thermostatic expansion valve 17 to the evaporator 5. By means of heat (arrow 19) extracted from the environment by the evaporator 5, the liquid ammonia evaporates in the evaporator 5 and is then passed in the gaseous state through a lead 21 to the absorber 7. The gaseous ammonia from the lead 21 is dissolved in the absorber 7 in the solution of ammonia and water present therein so that a solution is formed which is rich in ammonia. The heat developed in the condenser 3 and in the absorber 7 is transferred by means of heat exchangers 23 and 25 to a heat-transporting medium, such as, for example, water, in a lead system 27 which is coupled to a load. From the generator 1 poor solution flows under the influence of the force of gravity to the absorber 7 arranged beneath the generator 1 via a lead 29 in which an expansion valve 31 is located. The poor hot solution in the lead 29 and the rich cold solution in the lead 11 may be thermally coupled to each other by means of a counterflow heat exchanger. The hot liquid ammonia in the lead 21 may also be thermally coupled to the cold gaseous ammonia by means of a heat exchanger directly behind the evaporator 5. For the sake of simplicity, the said heat exchangers are not shown in FIG. 1.

It should be noted that the meaning of the term "heat pump" is to be understood also to include that kind of heat pumps wherein the evaporator 5 of FIG. 1 is replaced by a so-called "degaser" which takes up heat from the environment, whilst the condenser 3 of FIG. 1 is replaced by a so-called "resorber" which gives off heat to the heat-transporting medium. From the degaser poor liquid solution is pumped by means of a second liquid pump to the resorber and is then enriched by the gaseous condensing ammonia from the generator. In such a heat pump, use is consequently made of two circuits with solution instead of the single circuit with solution in an absorption heat pump so that two liquid pumps 9 are required.

The part of the lead 11 located between the pump 9 and the absorber 7 will be designated hereinafter as suction lead 11a, whilst the part of the lead 11 between the pump 9 and the generator 1 will be designated as delivery lead 11b. Various embodiments of the pump 9 will be described below. In FIG. 1, the common analogous parts of these various embodiments are denoted diagrammatically as far as possible by corresponding reference numerals.

Figure 2:
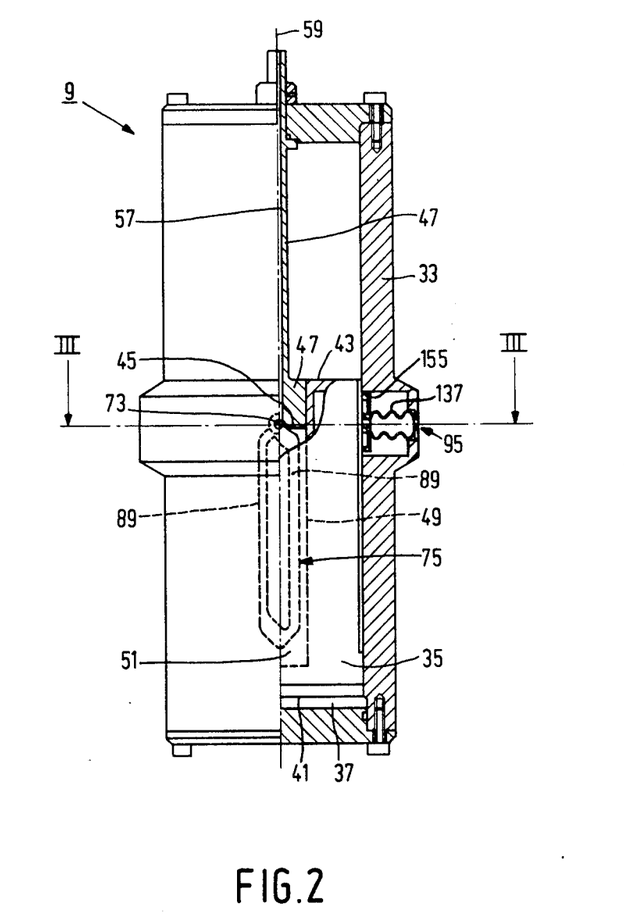
FIG. 2 shows partly in longitudinal elevation and partly in longitudinal sectional view a liquid pump having a translation/rotation piston.
Figure 3:
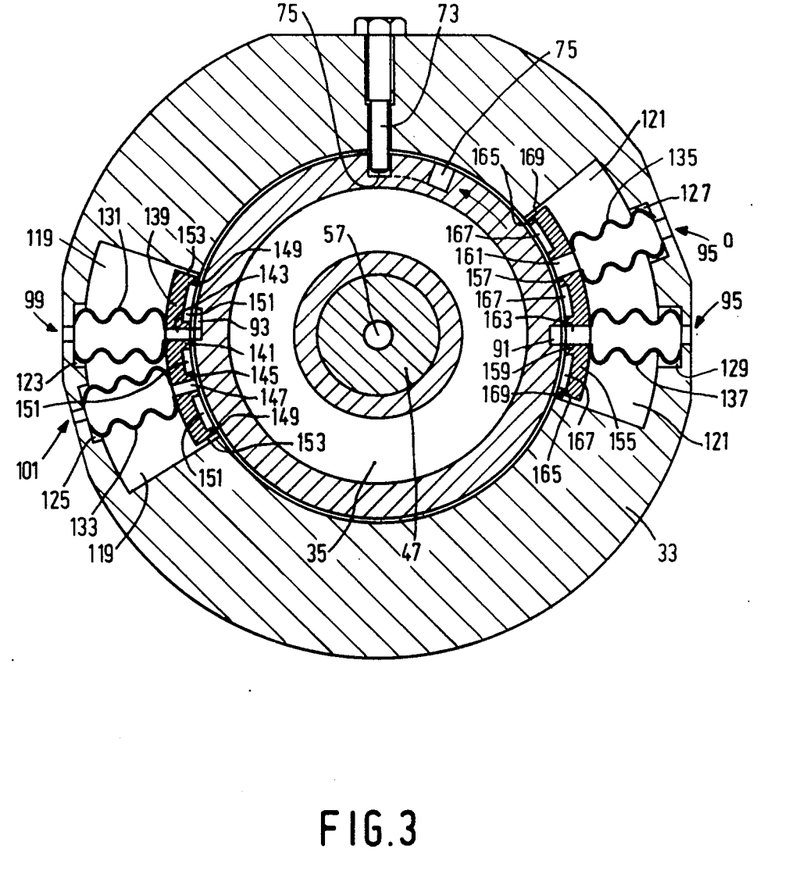
FIG. 3 shows on an enlarged scale a sectional view taken on the line III—III in FIG. 2.
Figure 4:
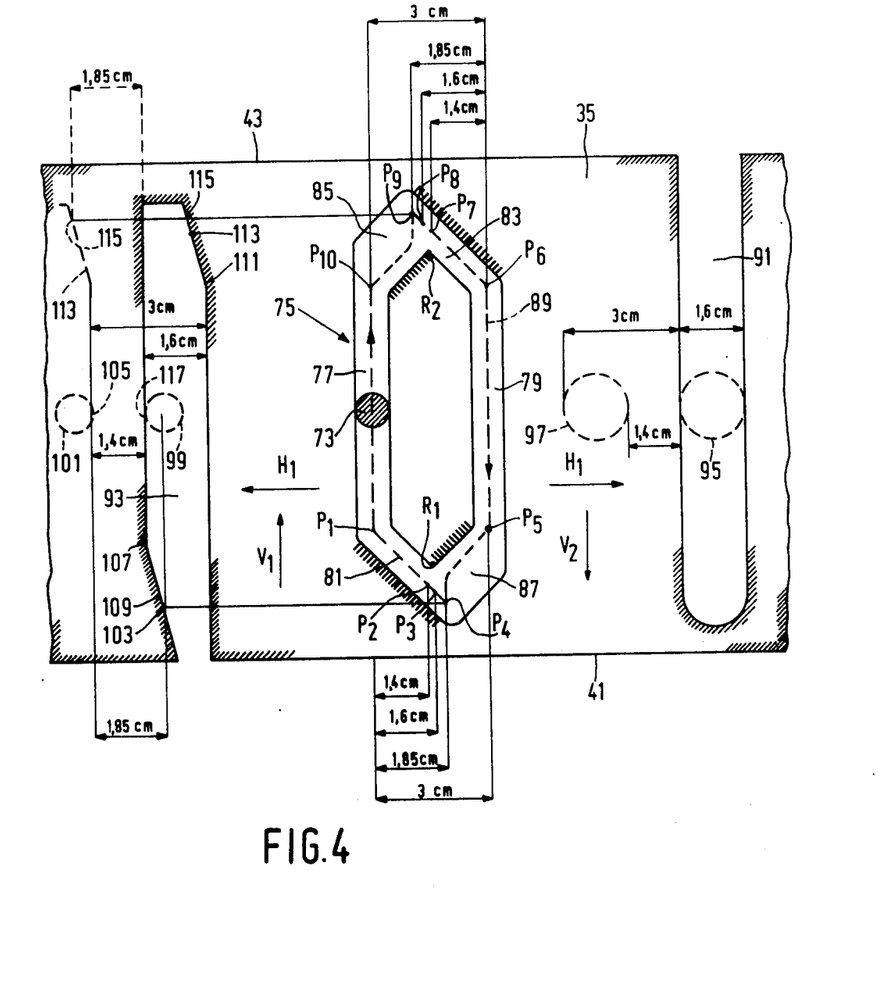
FIG. 4 is a developed view in a flat plane of the liquid piston of the liquid pump shown in FIGS. 2 and 3.

The pump 9 has a cylinder 33 of circular cross-section in which a cylindrical liquid piston 35 is displaceable in a reciprocatory manner. In the cylinder 33 there is provided a gas chamber 37 on one side of the piston 35 and a liquid chamber 39 on the other side of the piston 35. The piston 35 has a first working surface 41 which faces the gas chamber 37 and a second working surface 43 which faces the liquid chamber 39. Between an end face 45 of a cylindrical guide member 47 which is secured to the cylinder 33 and which snugly fits into a recess 49 of the piston 35 and the wall of the recess 49 there is provided an auxiliary chamber 51 having a variable volume in which liquid solution is constantly present. The suction lead 11a is connected via a non-return valve 53 to the liquid chamber 39, whilst the delivery lead 11b is connected via a non-return valve 55 to the liquid chamber 39. The non-return valves 53 and 55 operate viewed in the direction of transport of the solution, in opposite directions, the non-return valve 53 serving as a suction valve and the non-return valve 55 serving as a delivery valve. The auxiliary chamber 51 is connected via a bore 57 in the guide member 47 to a branch lead 59 of the suction lead 11a. Further, part of the pump 9 can be a gas switch 61 having two inputs 63 and 65 and one output 67 which is connected to the liquid chamber 37. The input 63 is connected through a lead 69 to the lead 21, whilst the input 65 is connected through a lead 71 to the lead 13. As will be explained in more detail hereinafter with reference to the description of the various pump constructions, the gas switch 61 in the embodiment of FIGS. 2, 3 and 4 is constituted by ports in the wall of the cylinder 33 in conjunction with a specific piston shape and piston movement (translation plus rotation), whilst the gas switch 61 in the embodiment of FIGS. 5 and 6 can be recognized as a separate switching unit; finally, in the embodiment of FIGS. 7, 8 and 9, the gas switch 61 is integrated with a liquid switch in the same housing into an integrated switching unit. The suction lead 11a and the delivery lead 11b are constantly at a comparatively low and high pressure level, respectively, while the leads 69 and 71 are also at a comparatively low and high pressure level, respectively. The operation of the absorption heat pump and liquid pump for an absorption heat pump, respectively, will now be described with reference to the various embodiments.

In the pump 9 shown in FIG. 2, the auxiliary chamber 51 is connected through the bore 57 in the conductor 47 to the branch lead 59, as shown in FIG. 1. The pressure of the liquid solution in the auxiliary chamber 51 will therefore constantly be at a comparatively low level, i.e. approximately at the pressure level prevailing in the absorber 7. The gas chamber 37 is connected alternately to the lead 21 (69) and the lead 13 (71) so that in the gas chamber alternately approximately the low pressure level of the absorber 7 and the high pressure level of the generator 1 prevails. The liquid chamber 39 is alternately connected to the comparatively low pressure level of the suction lead 11a during the suction stroke of the piston and to the comparatively high pressure level of the delivery lead 11b during the delivery stroke of the piston. During the suction stroke a comparatively low pressure prevails on both sides of the piston 35, while during the delivery stroke a comparatively high pressure prevails on both sides of the piston. The pressure variation in the two chambers 39 and 41 is consequently synchronous. The change of pressure level in the chambers 39 and 41 is obtained in that besides the tranlatory movement also a rotary movement is imparted to the piston during a part of the suction stroke and a part of the delivery stroke. This will be explained more fully with reference to the developed view of the piston 35 in the plane of the drawing in FIG. 4.

The cylinder 33 (see also FIG. 3) is provided with a fixedly arranged pin 73 which constitutes a guide for a slot 75 in the piston 35. The slot 75 is constituted by two tracks 77 and 79 parallel to the central axis of the piston 35 and by two parallel tracks 81, 83 and 85, 87 which extend at an angle to the central axis and constitute with the tracks 77 and 79 a continuous curve. The tracks 81 and 87 and the tracks 83 and 85 enclose a straight angle with each other. In FIG. 4, a dotted line 89 indicates in which manner the piston 35 and the slot 75, respectively, move along the pin 73. The part of the wall of the slot 75 engaging the pin 73 is indicated by a shaded area. Two gas ports and two liquid ports in the wall of the cylinder 33 are indicated by dotted lines. In FIG. 4, gaseous working medium is constantly present beneath the first working surface 41 and liquid solution is constantly present above the second working surface 43. The piston 35 has a liquid duct 91 extending parallel to its central axis and a gas duct 93 extending parallel to its central axis. The liquid duct 91 forms during the delivery stroke the connection between the liquid chamber 39 located above the working surface 43 and a high-pressure liquid port 95 in the cylinder 33 and forms during the suction stroke the connection between the liquid chamber 39 and a low-pressure liquid port 97 in the cylinder 33. The direction of the piston movement during the delivery stroke and during the suction stroke is indicated by the arrows $V_1$ and $V_2$, respectively, in FIG. 4. The high-pressure liquid port 95 is connected during the delivery stroke via the delivery valve 55 (see FIG. 1) to the delivery lead 11b and the generator 1, whilst the low-pressure liquid port 97 is connected via the suction valve 53 to the suction lead 11a and the absorber 7 during the suction stroke. The gas duct 93 forms during the delivery stroke the connection between the gas chamber 37 located beneath the working surface 41 and a high-pressure gas port 99 in the cylinder 33 and forms during the suction stroke the connection between the gas chamber 37 and a low-pressure gas port 101 in the cylinder 33. The high-pressure gas port 99 is connected during the delivery stroke via the lead 71 and the lead 13 to the generator 1, whilst the low-pressure gas port 101 is connected via the lead 69 to the lead 21 after the evaporator 5. In FIG. 4, the most important dimensions in cms are indicated in order to illustrate the change from high-pressure to low-pressure ports and conversely.

There is started from the situation shown in FIG. 4, in which the piston is located halfway the delivery stroke and moves in the direction of the arrow $V_1$. Gaseous working medium at high pressure is present beneath the piston 35 and liquid solution at substantially the same high pressure as beneath the piston is present above the piston. The auxiliary chamber 51 (see also FIG. 1) contains liquid solution at low pressure. The difference in surface area between the first working surface 41 and the second working surface 43 and the low pressure in the auxiliary chamber 51 produce an upwardly directed (in the direction of the arrow $V_1$) resulting force on the piston 35 during the delivery stroke. As long as the track 77 of the slot 75 is guided along the pin 73, the piston 35 performs a translation in the direction $V_1$. From the instant at which a point $P_1$ of the slot 75 coincides with the centre of the pin 73, the shaded part of the track 81 will engage the pin 73 so that the piston 35 performs in conjunction with the translation $V_1$ a rotation in the direction $H_1$. As a result, the liquid duct 91 is displaced to the left over a distance of 1.4 cm until the point $P_2$ of the slot 75 coincides with the centre of the pin 73. At this instant the high-pressure liquid port 95 is not yet sealed completely from the liquid duct 91 and the low-pressure liquid port 97 is not yet connected to the liquid duct. An overlap corresponding to 0.2 cm in FIG. 4 is still present. In the trajectory corresponding to $P_2-P_3$ (0.2 cm displacement to the left), a high-pressure liquid port 95 is consequently connected through the liquid duct 91 to the low-pressure liquid port 97 so that a small quantity of solution flows to the absorber 7. Also due to the decreasing volume of the auxiliary chamber 51, a small quantity of liquid solution flows to the absorbr 7. The said quantities of solution are of minor importance and are taken up in the abosrber 7 again in the second circuit. Because the distance between a point 103 of the gas duct 93 and a point 105 of the low-pressure gas port 101 is 1.85 cm, for the point $P_3$ the gas duct 93 is not yet connected to the low-pressure gas port 101, but is still connected to the high-pressure gas port 99. Whereas due to the shortcircuit between the liquid ports 95 and 97 the pressure on the liquid side of the piston 35 decreases rapidly, the gaseous working medium on the gas side of the piston 35, which still is at high pressure, can expand is in the enlarging gas chamber 37. Thus, the trajectory $P_2-P_3-P_4$ can be bridged by the piston 35, and a first reversal point $R_1$ can be passed. The gas duct 93 is provided beyond a first bending poing 107 with a first bevelled edge 109. This bevelled edge 109 has two effects. In the first place, it is achieved that the change of the gas ports 99, 101 at the end of the delivery stroke lags behind the change of the liquid ports 95, 97. As a result, the expansion of the gaseous working medium in the gas chamber 37 can be utilized to bridge the trajectory $P_2-P_3-P_4$. Due to the bevelled edge 109, this lagging can take place at an equal distance of in FIG. 4/1.4 cm between the liquid ports and the gas ports. The distance which has to be covered by the piston 35 in the direction $H_1$ before by vertical displacement in the direction $V_1$ the point 103 on the bevelled edge 109 coincides with the point 105 of the low-pressure gas port 101, is in fact 1.85 cm. This distance of 1.85 cm is also equal to the distance projected in the horizontal direction between the points $P_1$ and $P_4$. In the second place, it is achieved with the aid of the bevelled edge 109 that the low-pressure gas port 101 opens rapidly in the trajectory $P_4-P_5$ so that the track 87 rapidly passes the pin 73 and therefore the change of ports is rapidly terminated. Due to the bevelled form of the edge 109, the gas port 101 opens comparatively more repidly than in the case of a fully straight gas duct. Dead centres during the reversal of the movement of the piston are thus avoided. In the point $P_4$ the reversal of the movement of the piston takes place and the shaded part of the track 87 engages the pin 73. The low-pressure gas port 101 is opened rapidly in the trajectory $P_4-P_5$ which already belongs to the suction stroke. In the point $P_5$ the rotation (corresponding to $H_1$) of the piston starting in the point $P_1$ is terminated. Subsequently, during the suction stroke the track 79 is guided along the pin 73 in a downward movement of the piston. The trajectory $P_5-P_6$ represents a pure translation of the piston, while the trajectory $P_1-P_5$ represents a combined translation and rotation. In the trajectory $P_1-P_5$ the rotation invariably takes place in the same direction, whilst the translation is directed upwards ($V_1^1$) for the trajectory $P_1-P_4$ (delivery stroke) and downwards ($V_2$) for the trajectory $P_4-P_5$. At the instant at which the point $P_6$ of the slot 75 coincides with the centre of the pin 73, a rotation of the piston is started with a continued translation. This rotation is opposite to the rotation in the trajectory $P_1-P_5$ and leads to a displacement in the direction $H_2$ in FIG. 4. The shaded part of the track 83 is now guided along the pin 73. In the point $P_7$, after a displacement of 1.4 cm of the piston to the right, the high-pressure liquid port 95 starts to open. Because of the overlap of 0.2 cm, the low-pressure liquid port 97 is still opened during the trajectory $p_7-P_8$ and shortcircuited with the high-pressure liquid port 95 so that the pressure in the liquid chamber 39 already increases before the high-pressure gas port 99 is opened. Further, a small quantity of solution leaks via the low-pressure liquid port 97 away to the absorber 7. The gaseous working medium still at low pressure in the gas chamber 37 is compressed by the increasing pressure in the liquid chamber. This results in that the trajectory $P_7-P_8-P_9$ is bridged and a second point of reversal $R_2$ is passed. The gas duct 93 is provided beyond a second bending point 111 with a second bevelled edge 113. Completely in analogy with the first bevelled edge 109, the second bevelled edge 113 also has the effect that also at the end of the suction stroke the change of the gas ports 101,99 lags behind the change of the liquid ports 97,95. The distance which has to be covered by the piston in the direction $H_2$ before by vertical displacement in the direction $V_2$ a point 115 on the bevelled edge 113 (from the dotted position) coincides with a point 117 of the high-pressure gas port 99, is again 1.85 cm. This distance of 1.85 cm is equal to the distance projected in the horizontal direction between the points $P_6$ and $P_9$. The bevelled edge 113 also leads to a rapid opening of the high-pressure gas port 99 in the trajectory $P_9-P_{10}$. In the point $P_{10}$ the high-pressure gas port 99 is completely opened. The shaded part of the track 85 is guided along the pin 73 during the beginning of the new delivery stroke which starts in the point $P_9$ and which in the trajectory $P_9-P_{10}$ still takes place with a not completely opened high-pressure gas port 99 and with a combined translation (direction $V_1$) and rotation (corresponding to $H_2$) of the piston.

It should be noted that during the section stroke in the trajectory $P_4-P_9$ a low pressure prevails both in the liquid chamber 39 and in the gas chamber 37. The auxiliary chamber 51 contains liquid solution at low pressure. The movement of the piston is now obtained by the weight of the piston and the weight of the liquid solution sucked in the liquid chamber 39 from the absorber 7.

Alternatively, use may be made of a spring which is tensioned during the delivery stroke and is released during the suction stroke and exerts a downwardly directed force on the piston. Further, as the case may be in conjunction with a spring, a liquid switch may be used which admits liquid at low pressure into the auxiliary chamber 51 during the delivery stroke and admits liquid at high pressure into this chamber during the suction stroke. Such a liquid switch is used, for example, in the embodiment of FIG. 5. It may further be stated that during the delivery stroke the pressures in the liquid chamber 39 and in the gas chamber 37 are substantially equal to each other. The pressure of the liquid solution in the liquid chamber 39 is only about 1% higher than the pressure in the gaseous working medium in the gas chamber 37 due to flow resistances in the delivery lead 11b, 11 and a pump height between the pump 9 and the generator 1 (see FIG. 1). The pressure of the gaseous working medium in the gas chamber 37 is about 10% higher than the pressure of the liquid solution in the liquid chamber 39 during the suction stroke. However, both pressures are comparatively low. The difference is due to flow losses in the suction lead 11a, 11. In a practical embodiment of an absorption heat pump containing a solution of ammonia ($NH_3$) and water, the pressures in the liquid chamber 39 and in the gas chamber 37 during the delivery stroke were 20.3 $N/m^2$ and 20 $N/m^2$, respectively, and during the suction stroke 1.7 $N/m^2$ and 2 $N/m^2$, respectively.

Although due to the synchronous occurrence of high or low pressures on either side of the piston there is no necessity of providing a seal along the circumference of the piston, under given circumstances a leakage of gas may occur from the high-pressure gas port 99 to the low-pressure gas port 101 and a leakage of liquid may occur from the high-pressure liquid port 95 to the low-pressure liquid port 97. In order to reduce or to avoid the risk of the occurrence of such a leakage, use is preferably made of a local seal between the two gas ports and a local seal between the two liquid ports. The construction of the seal is explained in FIG. 3 with reference to a preferred embodiment. Although FIG. 3 is a sectional view taken on the line III—III in FIG. 2, the piston is shown in FIG. 2 at the beginning of the delivery stroke and in FIG. 3 at the instant at which the delivery stroke has already advanced so far that the pin 73 is situated in a vertical part of the slot 75. It should be noted that the developed view of the piston in FIG. 4 geometrically does not correspond to FIGS. 2 and 3, but is provided with corresponding reference numerals.

There are formed in the cylinder 33 two rectangular chambers 119 and 121 each having two circular recesses 123, 125 and 127, 129, respectively. The recesses 123 and 125 serve to center two elastic bellows 131 and 133, whilst the recesses 127 and 129 serve to center two elastic bellows 135 and 137. The chamber 119 accommodates a rectangular slipper 139, which is slightly biased by the bellows 131 and 133 against the piston 35. The surface of engagement is constituted by a circular edge 141 around an opening 143 in the slipper 139 and a circular edge 145 around an opening 147 in the slipper 139. The edges 141 and 145 have a comparatively small width of, for example, 1 mm. The openings 143 and 147 are connected via the interior of the bellows 131 and 133 to the high-pressure gas port 99 and to the low-pressure gas port 101, respectively. The slipper 139 further has a rectangular outer edge 149. Between this outer edge 149 and the edges 141 and 145 there is provided a recess 151 in the slipper 139. Further, a gap 153 is intentionally left between the rectangular chamber 119 and the rectangular slipper 139. The edges 141 and 143 are under all conditions in sealing engagement with the piston 35 because the small width of the edge does not offer a possibility of built-up (accumulation) of pressure between the edges and the piston. The gap 153 further ensures that on either side of the slipper 139 an equal pressure prevails. Therefore, there is no possibility of the slipper 139 being radially pressed outwards and the seal of the edges 141 and 145 being lost. In a manner analogous to that in the gas ports 99 and 101, a reliable seal is also guaranteed in the liquid ports 95 and 97. The bellows 135 and 137 are slightly biased against a rectangular slipper 155 having circular edges 157 and 159, which are located around openings 161 and 163 in the slipper 155. Between an outer edge 165 of the slipper 155 and the edges 157 and 159 there is provided a recess 167. Furthermore, a rectangular gap 169 is present between the chamber 121 and the slipper 155. The openings 161 and 163 are connected via the interior of the bellows 135 and 137 to the low-pressure liquid port 97 and the high-pressure liquid port 95, respectively. In the situation shown in FIG. 4, the gas duct 93 in the piston 35 is in open communication with the high-pressure gas port 99, whilst the liquid duct 91 is in open communication with the high-pressure liquid port 95.

It has been described with reference to FIG. 4 that the lagging of the change between the gas ports 99, 101 behind the change between the liquid ports 95, 97 was obtained by the bevelled edges 190 and 113 of the gas duct 93. Lagging can also be obtained by means of a straight gas duct 93 having parallel edges throughout its length if the distance between the gas ports is chosen to be larger than the distance between the liquid ports. Further, lagging can be obtained in that the widths of the gas duct 93 and of the liquid duct 91 are chosen differently.

Figure 5:
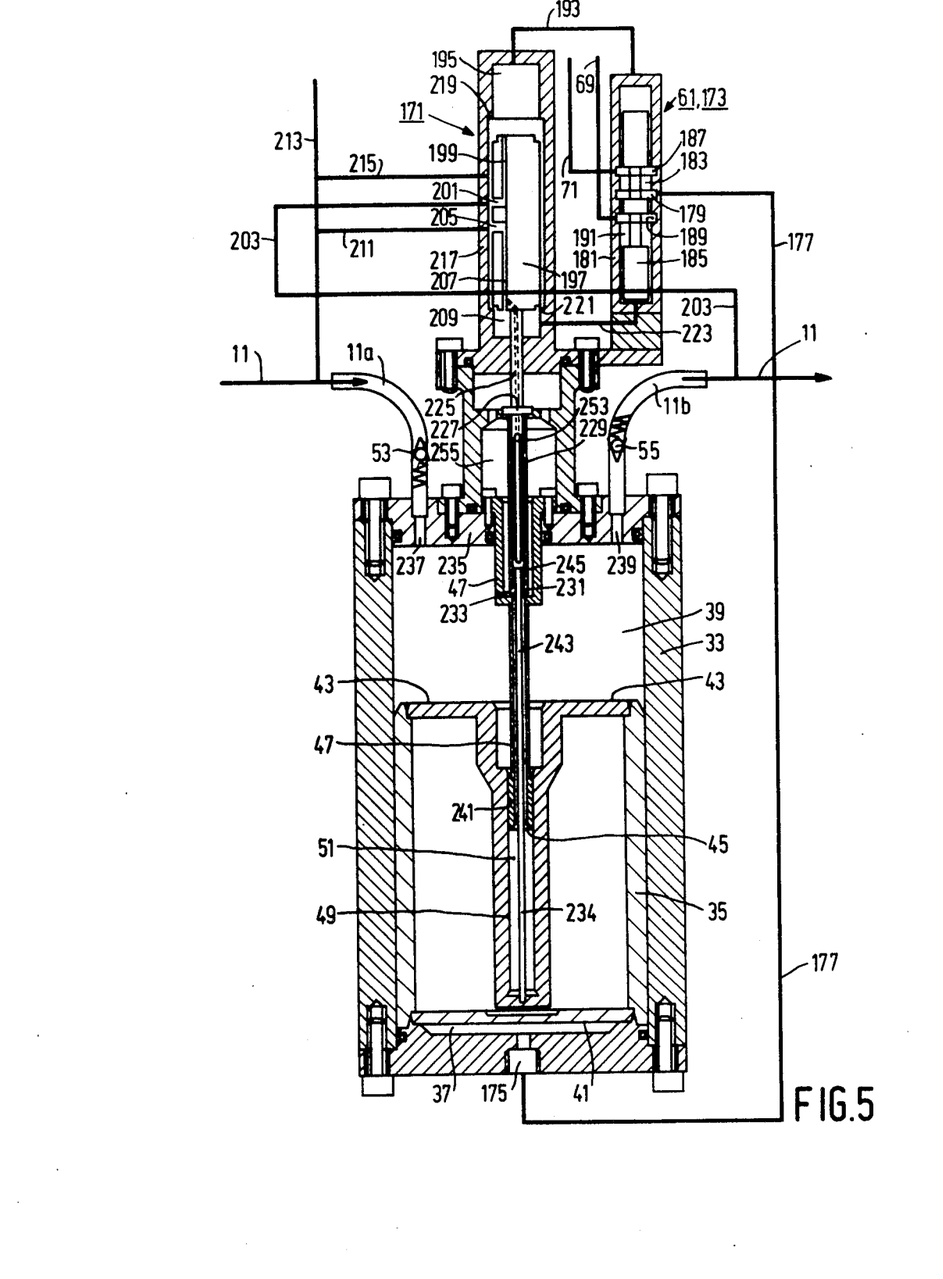
FIG. 5 is a longitudinal sectional view of a liquid pump controlled by a separate liquid switch and gas switch.
Figure 6:
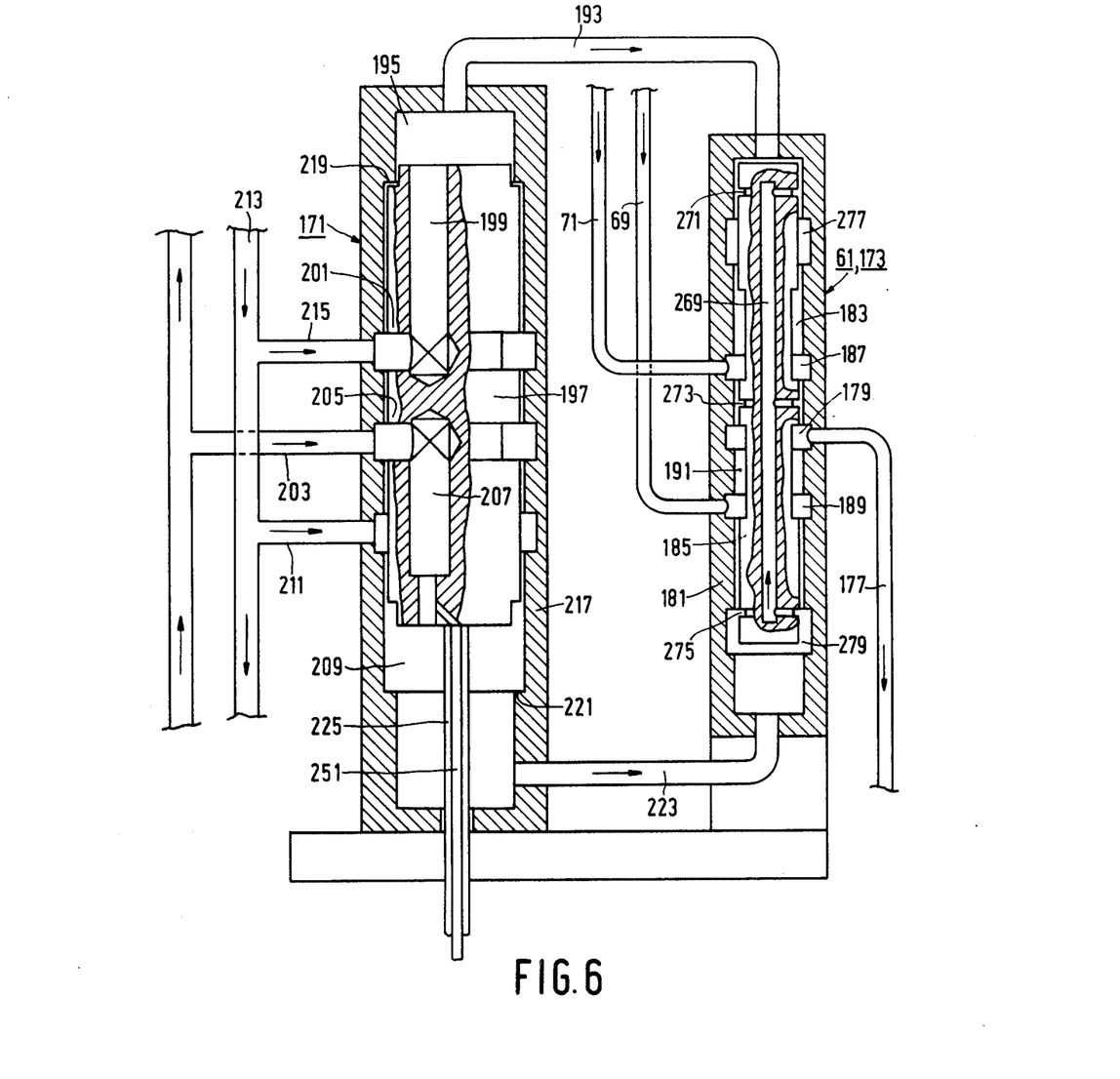
FIG. 6 shows on an enlarged scale the liquid switch and gas switch used in the liquid pump shown in FIG. 5.

In the further embodiment of a liquid pump for a heat pump shown in FIG. 5, a rotation of the piston is not utilized for the change of the pressure on either side of the piston 35. The piston 35 in FIG. 5 only performs a translatory movement. The change of the ports is effected by means of a combination of a separate liquid switch 171 and a separate gas switch 61 (see also FIG. 1), 173, the gas switch 61,173 being controlled by the liquid switch 171. Since the ports of the liquid pump shown in FIG. 5 are arranged in a configuration different from that of the ports in the pump shown in FIG. 2 and since the pump of FIG. 5 moreover accommodates only a single gas port, corresponding reference numerals are not used. This in contrast with the liquid pumps shown in FIGS. 5 and 7. In the situation shown in FIG. 5, the piston 35 is located just at the beginning of the delivery stroke. The liquid chamber 39 is filled with liquid solution in which the delivery pressure is built up. At the instant at which the pressure in the solution in the liquid chamber 39 has exceeded the pressure in the delivery lead 11b by an amount which is equal to the low spring tension (bias) of the spring-loaded delivery valve 55, the delivery valve 55 opens and solution is pumped via the lead 11b, 11 to the generator 1 (see FIG. 1). During the delivery stroke, gaseous working medium at a comparatively high pressure is present in the gas chamber 37. This working medium is supplied via a gas port 175 which is connected to a lead 177. the gas port 175 serves at the same time for supplying gaseous working medium at a comparactively low pressure during the suction stroke. In the situation shown, the lead 177 is connected via an annular chamber 179 in a housing 181 of the gas switch 173, an annular recess 183 in a switching slide 185 of the gas switch 173 and an annular chamber 187 in the housing 181 to the high-pressure gas lead 71 (see also FIG. 1). The housing 181 is further provided with an annular chamber 189, whilst the switching slide 185 is further provided with an annular recess 191. The annular chamber 189 is connected to the low-pressure gas lead 69 (see also FIG. 1). The space above the switching slide 185 contains during the delivery stroke liquid solution of high pressure, which is supplied through a lead 193 which is connected to a space 195 above the switching slide 197 of the liquid switch 171. Both the switching slide 197 and the switching slide 185 have substantially equal working surfaces at their both ends. The space 195 is connected by means of a duct 199 and a transverse bore 201 in a switching slide 197 to a lead 203, which is branched from the delivery lead 11b. The switching slide 197 of the liquid switch 171 is further provided with a transverse bore 205, which is connected via a duct 207 to a space 209 beneath the switching slide 197. The space 209 is connected via the duct 207 and the transverse bore 205 to a lead 211, which is branched from a lead 213 which is connected to the suction lead 11a. The lead 213 has a further branch in the form of a lead 215, which in the situation shown is blocked by the switching slide 197. The switching slide 197 is displaceable in a reciprocatory manner in a houding 217 between two end positions which are determined by two shoulders 219 and 221 formed in the wall of the housing 217. Furthermore, the space 209 is connected through a lead 223 to the space beneath the switching slide 185 of the gas switch 173. Consequently, liquid solution at low pressure is present beneath the switching slide 185 and the switching slide 197. The change from delivery stroke to suction stroke and so from high to low pressure on either side of the piston will be explained with reference to FIGS. 5, 6 and 10, whereby it should be noted that the liquid switch and gas switch shown in detail in FIG. 6 are illustrated in the position corresponding to the suction stroke, while FIGS. 5 and 10 relate to the piston position corresponding to the delivery stroke.

It is further stated that during the delivery stroke the auxiliary chamber 512 contains liquid solution of low pressure, which originates from the suction lead 11a through a duct system which is described with reference to the description of the change from the delivery stroke to the suction stroke.

The switching slide 197 of the liquid switch 171 is secured to a guiding shaft 225 with a shoulder 227. The guiding shaft 225 has screwed onto it a pipe 229 which has at its end remote from the shoulder 227 an end wall 231 with a guiding opening 233. The cylinder 33 is provided with a cover 235 in which are arranged a low-pressure liquid port 237 and a high-pressure liquid port 239. The cover 235 has secured to it the hollow guide 47 for the piston 35, which has at its end facing the piston 35 a widened part 241 fitting into the recess 49 of the piston. A follower rod 243 secured to the piston 35 is slidably guided in the guiding opening 233 of the pipe 229. The end of the follower rod 243 remote from the piston 35 is provided with a shoulder 245 which is slidably guided in the pipe 229. There is provided between the lower side of the shoulder 245 and the end wall 231 a compression spring 247, which is loosely arranged in the pipe 229. A loose compression spring 249 (see FIG. 10) is likewise arranged on top of the shoulder 245. The operation of the compression springs 247 and 249 will be explained below more fully. The duct 207 in the switching slide 197 of the liquid switch 171, which is alternately connected to the high-pressure liquid lead 203 and to the low-pressure liquid lead 211, is connected to a duct 251 in the guiding shaft 225, which is in open communication with the pipe 229. The pipe 229 is provided with a longitudinal slot 253, through which the liquid can emanate to a chamber 255 in a pipe-shaped support 257 for the liquid switch 171 and the gas switch 173. The chamber 255 is connected by means of clearance space 259 between the guide member 47 and in order of succession the pipe 229 and the follower rod 243 to the auxiliary chamber 51. In fact, the space 209 beneath the switching slide 197 (see FIG. 5) is consequently in open communication with the auxiliary chamber 51. The shoulder 227 of the guiding shaft 225 alternately engages an abutment stop 261 in a bridge section 263 of the chamber 225 and an abutment stop 265 on the lower side of the housing 217 of the switching slide 197.

After the piston has been displaced upwards from the lowermost position over a distance $A_1$ (see FIG. 10), the upper side of the compression spring 249 engages an end face 267 of the guiding shaft 225. Since at that instant a low pressure prevails beneath the switching slide 197 and a high pressure prevails above the switching slide 197, the latter is in the position indicated in FIG. 5. The compression spring 249 is now compressed until the spring force is equal to the downwardly directed force on the switching slide 197. Subsequently, the switching slide 197 is displaced upwards until the shoulder 227 has reached the position indicated by a dotted line in FIG. 10. The distance covered by the piston in upward direction is at that instant $A_1 + A_2$ plus the depression of the spring 249, the distance $A_2$ being equal to half the stroke of the switching slide 197. At the instant at which the switching slide 197 has been displaced over the distance $A_2$ in upward direction, the pressure difference across the switching slide 197 is eliminated due to the fact that the liquid ports 201 and 205 are no longer in line with one of the leads 203, 211 and 215. The compression spring 249 can be released in this situation and drives the switching slide beyond its central position. The pressure difference again present across the switching slide 197 after the central position causes the latter to reach the final position, in which the shoulder 227 engages the abutment stop 265. The end of the delivery stroke is now reached with a distance $A_1 + 2A_2$ covered by the piston. The switching slide 197 now occupies the position shown in FIG. 6, which corresponds to the (beginning) suction stroke, the duct 199 and the space 195 being connected to the low-pressure liquid lead 215 via the liquid port 201, while the duct 207 and the space 209 are connected via the liquid port 205 to the high-pressure liquid lead 203. This also means that high pressure is produced beneath the switching slide 185 of the gas switch 173 via the lead 223, whilst low pressure is produced above the switching slide 185 via the lead 193 so that the switching slide 185 is displaced from the position in FIG. 5 to the position in FIG. 6. A pressure change of the liquid solution from low pressure to high pressure takes place in the auxiliary chamber 51 via the duct 251 in the guiding shaft 225 connected to the duct 207. The suction stroke now beginning has a course analogous to that of the delivery stroke described, on the understanding that at the end of the suction stroke the compression spring 247 beneath the shoulder 245 serves for changing the liquid ports.

The gas switch 173 is provided with means which prevent under all conditions that gaseous working medium leaks from high-pressure ports and spaces to low-pressure ports and spaces. Use is then made of a liquid seal. This liquid seal is illustrted in FIG. 6, in which the switching slide 185 of the gas switch 173 is in a position corresponding to the suction stroke with liquid solution of high pressure beneath and liquid solution of low pressure above the switching slide. The switching slide 185 is provided with a duct 269 which coincides with the central (longitudinal) axis of the switching slide and is connected through radial bores to three annular recesses 271, 273, 275 in the switching slide 185. The housing 181 of the switching slide has a cylindrical chamber 277 in the proximity of the upper side and a cylindrical chamber 279 in the proximity of the lower side. The diameter of the circular-cylindrical chamber 277 and 279 is larger than the diameter of the switching slide 185 and the inner diameter of the housing 181. Viewed in the longitudinal direction of the gas switch 173, the chambers 277 and 279 are positioned so that near the end of the delivery stroke in FIG. 6 (beginning suction stroke) the chamber 279 forms the connection between the lead 223 with high-pressure liquid and the duct 269, whilst near the end of the suction stroke (beginning delivery stroke) the chamber 277 forms the connection between the lead 193 with high-pressure liquid and the duct 269. In the situation shown in FIG. 6 at the end of the delivery stroke, liquid flows at high pressure via the chamber 279 into the duct 269 and thence to the annular recesses 271, 273 and 275. The gap between the inner wall of the housing 181 and the outer wall of the switching slide 185 is therefore filled between the annular chambers 187 and 179 with high-pressure liquid, which forms a seal between the high-pressure gas in the lead 71 and the low-pressure gas in the lead 177. A seal is formed between the high-pressure gas in the lead 71 and the low-pressure liquid in the lead 193 by the high-pressure liquid supplied via the annular recess 271 in the gap near the upper end of the switching slide 185. In case the switching slide 185 is located in the lower part of the housing 181, the seal is analogous to the seal already described. The high-pressure sealing liquid is then supplied through the chamber 277.

Figure 7:
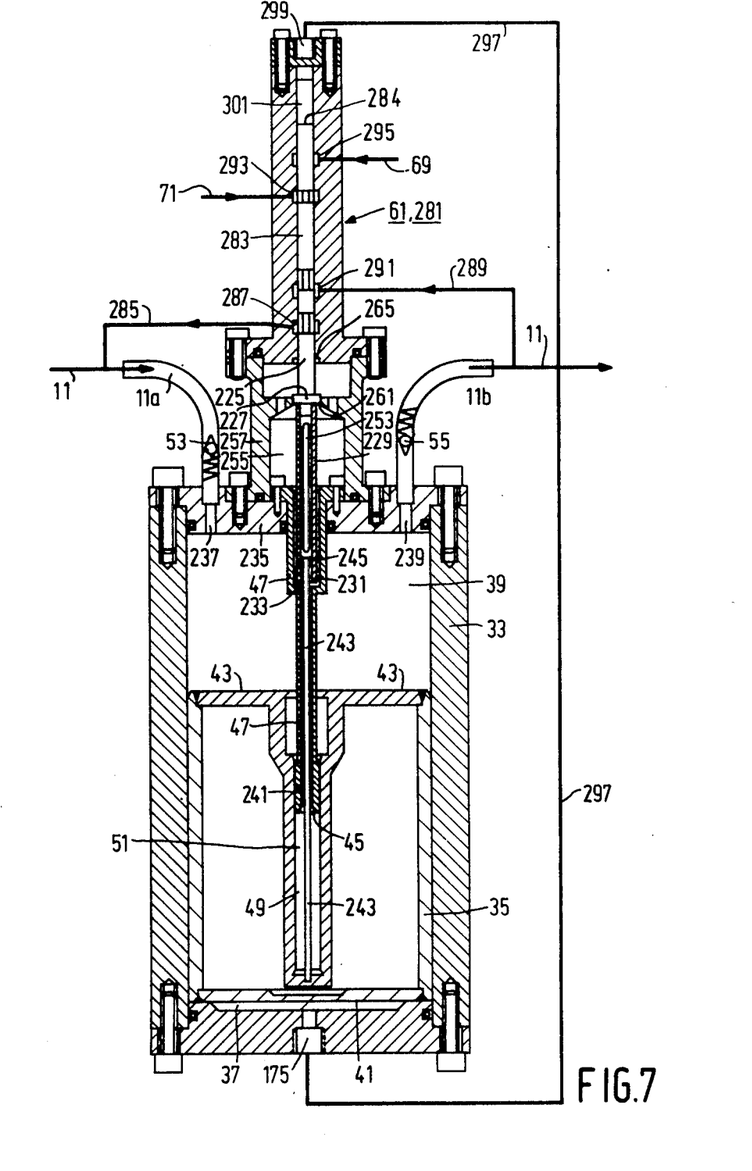
FIG. 7 is a longitudinal sectional view of a liquid pump controlled by the integrated unit of the liquid switch and the gas switch.
Figure 8:
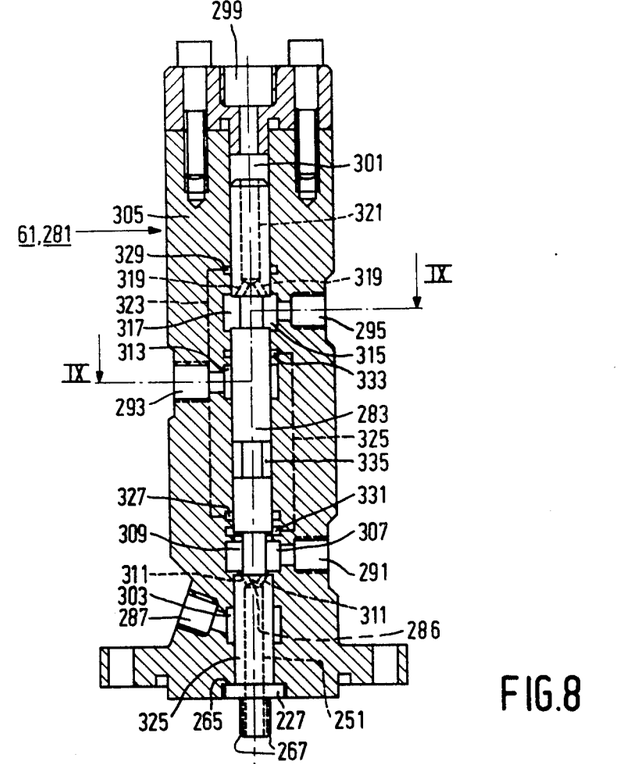
FIG. 8 shows on an enlarged scale a longitudinal sectional view of the integrated unit of the liquid switch and the gas switch used in the liquid pump shown in FIG. 7.
Figure 9:
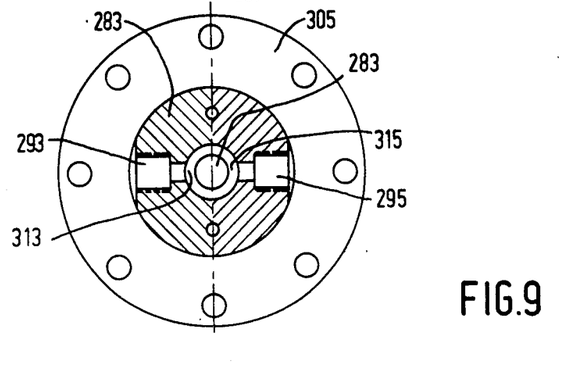
FIG. 9 is a cross-sectional view taken on the line IX—IX in FIG. 8.
Figure 10:
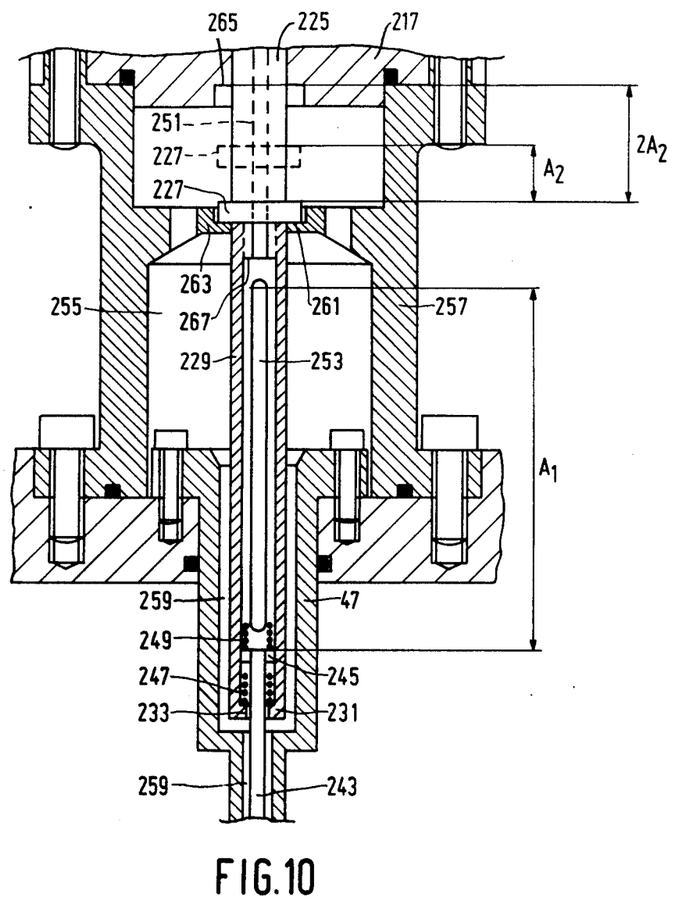
FIG. 10 shows on an enlarged scale a detail of the liquid pumps of FIGS. 5 and 7.

In the preferred embodiment of a liquid pump used in a heat pump shown in FIGS. 7, 8 and 9, the liquid switch 171 and the gas switch 173 of FIG. 6 are integrated to a combined liquid/gas switch 281 having a single common switching slide 283 provided at both ends with equal working surfaces 284 and 286. Apart from the construction of the switch 281, the liquid pump of FIG. 7 is analogous to the liquid pump of FIG. 5. FIG. 10 therefore also relates to the liquid pump of FIG. 7. In FIGS. 7 and 10, the situation at the beginning of the delivery stroke is shown, while FIG. 8 shows the situation at the beginning of the suction stroke. As is shown in FIG. 7, a lead 285 branched from the suction lead 11$a$ is connected to a low-pressure liquid port 287, whilst a lead 289 branched from the delivery lead 11$b$ is connected to a high-pressure liquid port 291. Further, a high-pressure gas port 293 is connected to the lead 71, whilst a low-pressure gas port 295 is connected to the lead 69 (see also FIG. 1). The gas port 175 in the cylinder 35 is connected through a lead 297 to a gas port 299 in the switch 281, which is connected to a space 301 above the switching slide 283. In the switch 281, gas (working medium) is constantly present above the switching slide 283 and liquid (solution) is constantly present beneath the switching slide. The change-over from the delivery stroke to the suction stroke is effected in the same manner as described already with reference to FIG. 10 for the liquid pump of FIG. 5. By means of the switch 281 shown on an enlarged scale in FIG. 8, the course of the gas and liquid flows will be illustrated, on the understanding that FIG. 8 shows the situation at the beginning of the suction stroke.

The low-pressure liquid port 287 is connected to an annular chamber 303, which is formed in the inner wall of a housing 305 for the switching slide 283. In the situation shown, the low-pressure liquid port 287 is blocked by the switching slide 283. On the contrary, the high-pressure liquid port 291 is connected through an annular chamber 307 in the housing 305 and an annular recess 309 in the switching slide 283 to the lower side of the switching slide. Moreover, the high-pressure liquid port 291 is connected through bores 311 to the lead 251 in the guiding shaft 225 so that high pressure also prevails in the auxiliary chamber 51 during the suction stroke. Further, the high-pressure gas port 293 is connected to an annular chamber 313 in the housing 305. The gas port 293 is blocked by the switching slide 283. The low-pressure gas port 295 is in order of succession via an annular chamber 315 in the housing 305, an annular recess 317 in the switching slide 283, bores 319 and a duct 321 in the switching slide 283 in open communication with the space 301 above the switching slide. In the switching slide 283 there are present two ducts 323 and 325 parallel to the central longitudinal axis of the switching slide. The duct 323 is connected to two annular chambers 327 and 329 in the housing 305, whilst the duct 325 is connected to two annular chambers 331 and 333 in the housing 305. Further, the switching slide 283 is provided with an annular recess 335, which is located between the annular recesses 309 and 317. In the situation shown, liquid is supplied through the high-pressure liquid port 291 to the annular chamber 331 and thence via the duct 325 to the annular chamber 333. This means that high-pressure liquid will serve as a seal in the gap (not visible in FIG. 8) between the housing 305 and the switching slide 283 between the high-pressure gas port 293 (chamber 313) and the low-pressure gas port 295 (chamber 315). The position and the dimension of the annular recess 335 located between the annular recesses 309 and 317 with respect to the stroke length of the switching slide 283 are such that, when the switching slide 283 is in the delivery position, the recess 335 connects the high-pressure liquid port 291 and the annular chamber 327 and 331 to each other. This results in that during a delivery stroke both ducts 223 and 325 contain liquid at high pressure so that high-pressure liquid will serve as a seal between the space 301 and the low-pressure gas port 295 via the chamber 329 and between the high-pressure gas port 293 and the low-pressure gas port 295 via the chamber 333.

The heat pump and the liquid pump are not limited to the embodiments described. For example, it is possible to obtain the rotation of the piston by means of permenent magnets in the piston and the cylinder which attract or repel each other near the end of the delivery stroke and the suction stroke. The pin-slot guiding is then not necessary. Each of the said bellows may be arranged in a separate chamber. The gas duct and the liquid duct are connected in this case via one or more of a large number of transverse bores in the piston to the interior of the bellows. The transverse bores constitute a row which extends parallel to the gas duct or the liquid duct.

The change-over from the delivery stroke to the suction stroke or conversely may be effected by means of a pneumatic switch comprising a so-called snap action spring. The change-over takes place in a comparatively short time due to the snap effect of the snap action spring.

Between the piston and the guide member in the auxiliary chamber there may be arranged a spring which is depressed during the delivery stroke and is released during the suction stroke. Such a spring may also be arranged in the liquid chamber between the piston and the cylinder.

What is claimed is

1. A heat pump comprising a first circuit in which a working medium is passed from a generator (1) successively to a condenser (3), an evaporator (5) and an absorber (7) and a second circuit in which a solution of the working medium and a solvent which is comparatively poor in working medium content is passed from the generator (1) to the absorber (7) and a solution of the working medium and a solvent which is comparatively rich in working medium content is passed from the absorber (7) to the generator (1), the transport of the rich solution from the absorber (7) to the generator (1) taking place by means of a liquid pump (9) arranged in a connection between the absorber (7) and the generator (1) and having a liquid piston (35) which is displaceable in a cylinder (33) in a reciprocatory manner and whose movement is reversible by means of a gas switch (61, 173, 281), which alternately connects a working surface (41) of the liquid piston (35) to gaseous working medium in the heat pump at a comparatively low and at a comparatively high pressure level, characterized in that the said working surface (41) constitutes a first working surface (41) of the liquid piston (35) facing a gas chamber (37) located in the cylinder (33), which piston further has a second working surface (43) which faces a liquid chamber (39) located in the cylinder (33) and which is smaller than the first working surface (41) and is separated therefrom by a liquid piston (35), the gas chamber (37) being connected to the gaseous working medium in the heat pump alternately at a comparatively low and high pressure level, whilst synchronously therewith the liquid chamber (39) is connected to the liquid solution in the heat pump alternately at a comparatively low and a comparatively high pressure level, which cylinder (33) is provided with a guide member (47) for the piston (35) arranged in the liquid chamber (39) and passed into a recess (49) in the piston (35), whilst an end face (45) of the guide member (47) constitutes with the recess (49) an auxiliary chamber (51) having a variable volume of liquid solution, whose pressure level at least during the delivery stroke of the liquid piston (35) is substantially equal to the low pressure level of the liquid solution in the heat pump.

2. A heat pump as claimed in claim 1, characterized in that the piston (35) is provided with a gas duct (93) which after rotation of the piston (35) in a first direction of rotation during the suction stroke forms a connection between the gas chamber (37) and a low-pressure gas port (101) in the cylinder (33) and with a liquid duct (91) which after rotation of the piston (35) in the first direction of rotation during the suction stroke forms a connection between the liquid chamber (39) and a low-pressure liquid port (97) in the cylinder (33), whilst after rotation of the piston (35) in a second direction of rotation opposite to the first direction of rotation the gas duct (93) in the piston (35) forms a connection between the gas chamber (37) and a high-pressure gas port (99) in the cylinder (33) and the liquid duct (91) in the piston (35) forms a connection between the liquid chamber (39) and a high-pressure liquid port (95) in the cylinder (33).

3. A heat pump as claimed in claim 2, characterized in that the cylinder is provided with a fixedly arranged pin (73) which constitutes a guide for a slot (75) in the piston (35), which has the form of a continuous curve having two tracks (77, 79) which are parallel to the central axis of the piston (35) and are interconnected by tracks (81, 83, 85, 87) extending at an angle to the central axis.

4. A heat pump as claimed in claim 2, characterized in that the cylinder (33) is provided with two sealing edges (141, 145) of the high-pressure gas port (99) and the low-pressure gas port (101), respectively, engaging the piston (35) with resilient force of an elastic bellow (131, 133) and with two sealing edges (157, 159) of the high-pressure liquid port (95) and the low-pressure liquid port (97), respectively, engaging the piston (35) with resilient force of an elastic bellow (135, 137), whereby the bellows (131, 133) corresponding to the gas ports (99, 101) form a connection of the relevant gas port to the gas duct (93) in the piston (35), while the bellows (135, 137) corresponding to the liquid ports (95, 97) form a connection of the relevant liquid port to the liquid duct (91) in the piston (35).

5. A heat pump as claimed in claim 1, characterized in that the gas chamber (37) is connected by means of the gas switch (61, 173) to gaseous working medium in the heat pump alternately at a comparatively low and a comparatively high pressure, whilst synchronously therewith the liquid chamber (39) is connected by means of a liquid switch (171) to liquid solution in the heat pump alternately at a comparatively low and a comparatively high pressure.

6. A heat pump as claimed in claim 5, characterized in that an integrated unit (281) of a liquid switch and a gas switch comprises a common switching slide (283) displaceable in a housing (305) in a reciprocatory manner and having two switching positions, whereby in a first switching position corresponding to the beginning of the suction stroke a connection is formed by means of a first recess (317) in the switching slide (283) between a first gas port (295) in the housing (305) at a comparatively low pressure level and a first working surface (284) of the switching slide (283) and a connection is formed by means of a second recess (309) in the switching slide (283) between a first liquid port (291) in the housing (305) at a comparatively high pressure level and a second working surface (286) of the switching slide (283) located opposite to the first working surface (284) and to the said auxiliary chamber (51), whilst in a second switching position corresponding to the beginning of the delivery stroke a connection is formed by means of the first recess (317) between a second gas port (293) in the housing (305) at a comparatively high pressure level and the first working surface (284) and a connection is formed by means of the second recess (309) between a second liquid port (287) in the housing (305) at a comparatively low pressure level and the second working surface (286) and to the said auxiliary chamber (51).

7. A heat pump as claimed in claim 5, characterized in that a switching slide (187,283) of the liquid switch (171) or of the integrated unit (281) of liquid switch and gas switch is mechanically coupled during a part of the suction stroke and the delivery stroke by means of a first spring (247) and a second spring (249), respectively, to the movement of a follower rod (243) which is secured to the piston (35) and is arranged coaxially with respect to the switching slide (197, 283) and the central axis of the piston (35) and is freely displaceable with respect to the follower rod (243) during another part of the suction stroke and the delivery stroke.

8. A heat pump as claimed in claim 5, characterized in that in the gas switch (61, 173) or in the integrated unit (281) of liquid switch and gas switch, respectively, ports (293, 295) and spaces (313, 315) at comparatively high and comparatively low gas pressure are separated from each other by a sealing liquid of comparatively high presure which is supplied through a duct system (323, 325, 309) in the housing (305) and the switching slide (283).

* * * * *